(12) United States Patent
Alderson et al.

(10) Patent No.: US 8,420,956 B2
(45) Date of Patent: Apr. 16, 2013

(54) ELECTRICAL DEVICE MOUNTING ADAPTER

(75) Inventors: R. David Alderson, Morganton, NC (US); Donald J. Hendler, Brookville, NY (US); Michael D. Williams, Morganton, NC (US)

(73) Assignee: Leviton Manufacturing Co., Inc., Melville, NY (US)

( * ) Notice: Subject to any disclaimer, the term of this patent is extended or adjusted under 35 U.S.C. 154(b) by 400 days.

(21) Appl. No.: 12/768,568

(22) Filed: Apr. 27, 2010

(65) Prior Publication Data

US 2011/0259634 A1    Oct. 27, 2011

(51) Int. Cl.
*H02G 3/08* (2006.01)

(52) U.S. Cl.
USPC ............... 174/480; 174/481; 174/66; 174/67; 220/3.2; 220/3.3; 220/241

(58) Field of Classification Search ............... 174/66, 174/67, 53, 58, 57, 17 CT; 220/241, 242, 220/3.7, 3.8; D13/156, 177, 152; D8/353; 439/535, 536; 200/239
See application file for complete search history.

(56) References Cited

U.S. PATENT DOCUMENTS

| | | | |
|---|---|---|---|
| 1,717,871 A * | 6/1929 | Both | 220/241 |
| 4,428,492 A | 1/1984 | Jorgensen | |
| 4,631,354 A | 12/1986 | Boteler | |
| 4,835,343 A | 5/1989 | Graef et al. | |
| 4,972,045 A * | 11/1990 | Primeau | 174/66 |
| 5,073,681 A * | 12/1991 | Hubben et al. | 174/66 |
| 5,153,816 A * | 10/1992 | Griffin | 174/66 |
| 5,189,259 A * | 2/1993 | Carson et al. | 174/66 |
| 5,895,888 A * | 4/1999 | Arenas et al. | 174/66 |
| 6,800,803 B1 | 10/2004 | Marumo | |
| 7,075,009 B1* | 7/2006 | Rohmer | 174/66 |
| 7,102,081 B2* | 9/2006 | Xu et al. | 174/66 |
| 7,112,744 B1 | 9/2006 | DeCosta | |
| D529,787 S | 10/2006 | Swiencicki et al. | |
| 7,211,727 B2 | 5/2007 | Pearse et al. | |
| 7,425,681 B2* | 9/2008 | Xu et al. | 174/66 |
| 7,456,358 B2 | 11/2008 | Swiencicki et al. | |
| D585,726 S | 2/2009 | DeCosta | |
| 7,554,036 B1 | 6/2009 | DeCosta | |
| 7,575,470 B2* | 8/2009 | Pyrros | 439/535 |
| 7,667,616 B2 | 2/2010 | Fair et al. | |
| 7,817,060 B2 | 10/2010 | Fair et al. | |
| 7,939,756 B2* | 5/2011 | Daniels et al. | 174/66 |

\* cited by examiner

*Primary Examiner* — Angel R Estrada
(74) *Attorney, Agent, or Firm* — Marger Johnson & McCollom PC

(57) ABSTRACT

In one embodiment, an adapter may include first and second mounting portions adapted to be attached to first and second mounting portions of an electrical device, and first and second spacers arranged to space the first and second mounting portion of the electrical device away from a building surface when the electrical device is mounted to an electrical box. In another embodiment, an adapter may include a ring to surround a body of a standard electrical device, and first and second slots to receive first and second mounting portion of the standard electrical device.

39 Claims, 12 Drawing Sheets

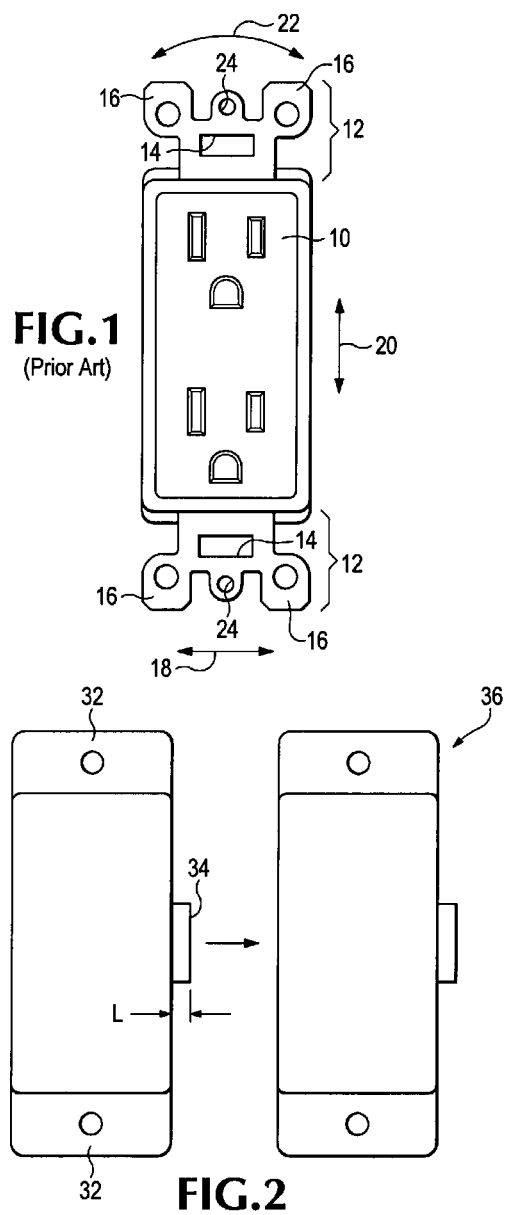

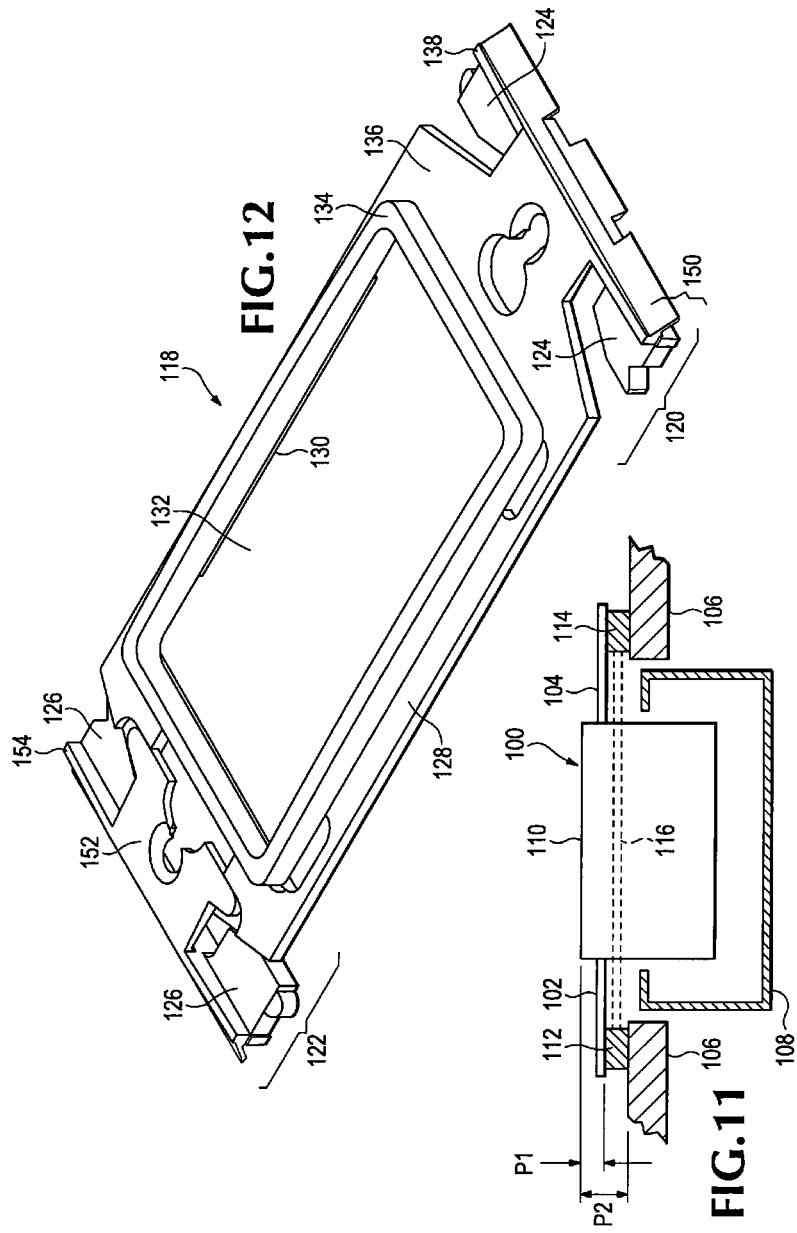

US 8,420,956 B2

ELECTRICAL DEVICE MOUNTING ADAPTER

BACKGROUND

FIG. 1 illustrates a front view of a prior art wiring device intended for mounting in a standard electrical box. The device of FIG. 1 includes a molded plastic body having a face 10 that may include any type of electrical interface. The example of FIG. 1 includes two receptacles (a duplex receptacle), but other examples include switches, dimmers, fan speed controls, occupancy sensors, etc. A wiring device typically includes a metallic strap that is used to mount the device in an electrical box. In the example of FIG. 1, two mounting portions 12 of the strap are visible. Each mounting portion includes an elongated hole 14. The wiring device is attached to the electrical box with two mounting screws that are passed through the mounting holes 14 and screwed into threaded holes in the electrical box.

The front face of the electrical box is typically flush with, or slightly recessed from, the face of the building materials that form the wall, floor or ceiling in which the box is mounted. Therefore, mounting ears or tabs 16 are included to keep the mounting portion of the strap flush with the building materials when the wiring device is attached to the electrical box.

The elongated holes 14 allow the position of the wiring device to be adjusted horizontally as shown by arrow 18, and to a lesser extent, vertically as shown by arrow 20 before the mounting screws are tightened down. The mounting holes 14 also enable the wiring device to rotate to a certain extent as shown by arrow 22. After the wiring device is attached to the electrical box, and its position adjusted, a wall plate is attached with screws that thread into wall plate mounting holes 24. The wall plate has an opening that is the same shape as the face 10 of the wiring device, and slightly larger so the face can fit within the opening.

In a multi-gang installation, two or more wiring devices are installed side-by-side in an electrical box. The three different types of adjustment make it difficult to maintain the relative alignment, i.e., horizontal spacing, rotation, vertical position, etc., of the devices so that their faces fit within the adjacent openings of a multi-gang wall plate. One prior art solution to the alignment problem involves the use of an alignment tool that holds the devices in the proper position while the installer tightens the mounting screws. The tool is then removed before the wall plate is installed. Another solution involves the use of a separate alignment plate that is attached to the wall first. Special holes on the wiring devices are aligned with pegs on the alignment plate which remains attached to the wall and becomes part of the installation.

BRIEF DESCRIPTION OF THE DRAWINGS

FIG. 1 is a front view of a prior art wiring device intended for mounting in a standard electrical box.

FIG. 2 illustrates a first embodiment of an electrical device according to some inventive principles of this patent disclosure.

FIG. 11 illustrates an embodiment of an adapter according to some of the inventive principles of this patent disclosure.

FIGS. 12 and 13 are perspective and side elevation views of another embodiment of an adapter according to some inventive principles of this patent disclosure.

DETAILED DESCRIPTION

Figure 3:
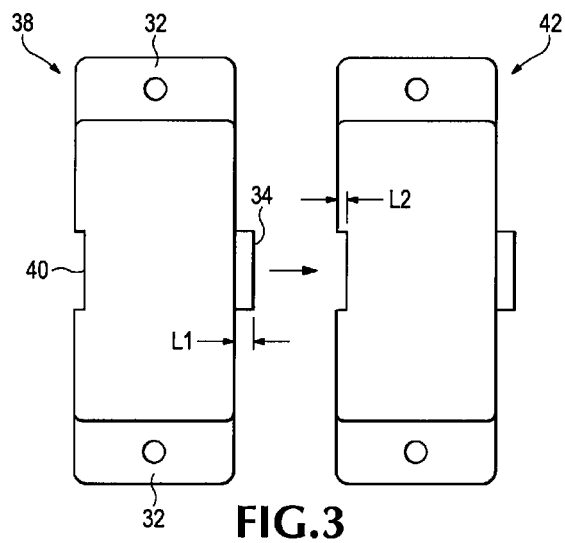
FIG. 3 illustrates a second embodiment of an electrical device according to some inventive principles of this patent disclosure.

Some of the inventive principles relate to electrical devices having alignment features that contact an adjacent electrical device to align the two devices. These features may be integral with the electrical device, or part of an adapter for the device.

FIG. 2 illustrates a first embodiment of an electrical device according to some inventive principles of this patent disclosure. The electrical device 30 of FIG. 2 has first and second mounting portions 32 arranged at opposite ends of the electrical device for mounting the device to an electrical box. An alignment feature 34 is adapted to align the electrical device with an adjacent electrical device 36 by contacting the adjacent electrical device when the two devices are mounted side-by-side in the electrical box. In this embodiment, the alignment feature 34 is shown as a rectangular tab that protrudes from one side of the device and engages a side of the adjacent device as the electrical device 38 slides laterally toward the adjacent electrical device 42.

The inventive principles contemplate various different sequences in which the devices may be mounted to the electrical box and aligned with each other and the box. For example, the first device 30 may be attached to the box with screws and secured in position by tightening the screws before attaching the second device 36. The second device may then be held against the face of the box, aligned by sliding it against the tab 34, then attached and secured with screws. Alternatively, both devices may be attached with screws that are not fully tightened. The devices may then be aligned relative to each other by engaging the tab on the first electrical device with the side of second electrical device. Once the devices are aligned relative to each other, and the box or wall, the screws may then be tightened to secure the devices to the box. Additional devices may be added in a similar manner on either side of the two devices. These and other sequences according to the inventive principles are also applicable to the other embodiments described below.

The arrangement illustrated in FIG. 2 primarily facilitates horizontal, and to a certain extent, rotational alignment between the devices. The length L of the tab 34 determines the spacing between the devices, which may be set to an appropriate value to enable faces of the devices to align with adjacent openings in a multi-gang wall plate. Although shown as a rectangular tab, the alignment feature may be realized in other forms.

In this and some other embodiments, the electrical devices are shown having identical alignment features, but the inventive principles do not require identical devices. The electrical devices illustrated in this embodiment, as well as other embodiments below, may include receptacles, switches, dimmers, fan speed controls, occupancy sensors and/or any other devices suitable for mounting in a single or multi-gang electrical box.

FIG. 3 illustrates a second embodiment of an electrical device according to some inventive principles of this patent disclosure. The electrical device 38 of FIG. 3 has first and second mounting portions 32 and an alignment feature 34 similar to the embodiment of FIG. 2 to align the electrical device 38 with a second electrical device 42. The embodiment of FIG. 3, however, includes a second alignment feature 40 on a second side of the electrical device opposite the first side that has the tab 34. The second alignment feature 40 is adapted to align the first electrical device 38 with another adjacent electrical device (not shown) to the left of the first device 38 by contacting the other adjacent electrical device as one or both of the devices slide laterally. In some embodiments, the first alignment feature 34 and the second alignment feature 40 may be directly opposite each other. In some other embodiments, the first alignment feature 34 and the second alignment feature 40 may be offset toward opposite ends of the wiring device.

In the embodiment of FIG. 3, the second alignment feature 40 is realized as a rectangular notch to accommodate at least a portion of a rectangular tab on an adjacent electrical device. A second device 42 also includes the same second alignment feature. Thus, when mounting the first and second electrical devices to an electrical box in any suitable sequence such as those described above with respect to FIG. 2, the tab 34 of the first device 38 may at least partially engage the notch 40 of the second electrical device to align the two devices as shown in the close up view of FIG. 4.

Figures 4, 5:
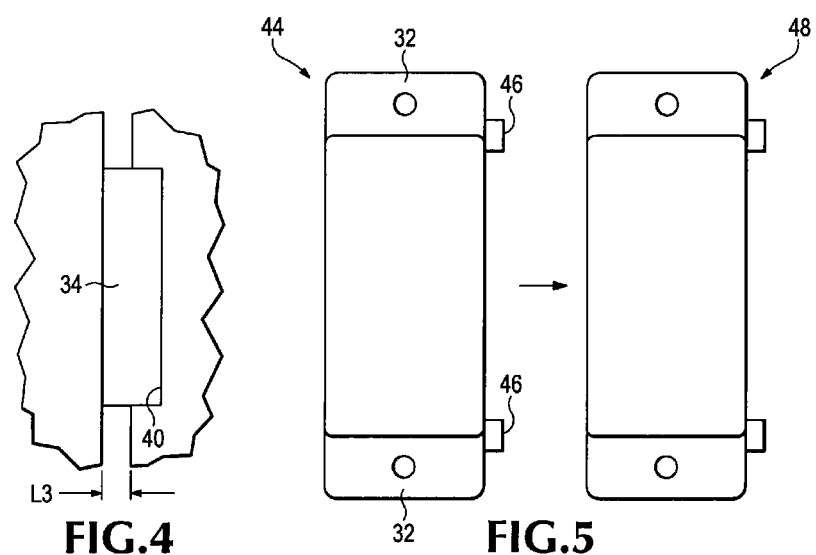
FIG. 4 is a close up view of the contact between the two adjacent electrical devices shown in FIG. 3.
FIG. 5 illustrates a third embodiment of an electrical device according to some inventive principles of this patent disclosure.

The arrangement of alignment features shown in FIGS. 3 and 4 facilitates vertical as well as horizontal and rotational alignment between the devices. The spacing L3 between the devices is determined by the difference between the length L1 of the tab 34 and the depth L2 of the notch 40. Although shown as rectangular tabs and notches, the alignment features may be realized in other forms and need not necessarily include the same or similar geometry; i.e., the tab may be in the form of a rectangle whereas the notch may utilize a different form, e.g., an ellipsoidal shape.

FIG. 5 illustrates a third embodiment of an electrical device according to some inventive principles of this patent disclosure. The electrical device 44 of FIG. 5 is similar to the embodiment of FIG. 2, but includes two alignment features 46 along one side of the device to align the device with an adjacent electrical device 48. The first and second alignment features may be substantially spaced apart along the side of the device 44 to provide improved rotational alignment between the two devices. The alignment features 46 may be located anywhere along the side of the device 44 such as completely on the first and second mounting portions 32, completely off the mounting portions, or partially on and partially off the mounting portions as shown in FIG. 5. Although shown as rectangular tabs, the alignment features may be realized in other forms.

Figure 6:
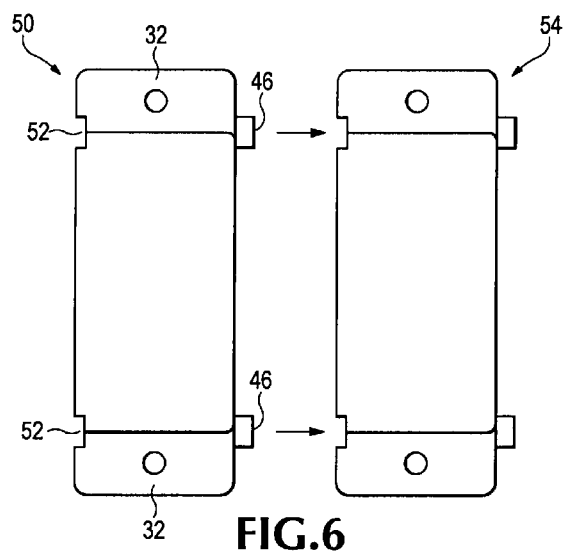
FIG. 6 illustrates a fourth embodiment of an electrical device according to some inventive principles of this patent disclosure.

FIG. 6 illustrates a fourth embodiment of an electrical device according to some inventive principles of this patent disclosure. The electrical device 50 of FIG. 6 is similar to the embodiment of FIGS. 3 and 4, but includes two complementary pairs of alignment features 46 and 52 on opposite sides of the device. As with the embodiment of FIG. 5, the alignment features on each side of the device may be substantially spaced apart along the side of the device 50 to provide improved rotational alignment between the two devices. The alignment features may be completely on the mounting portions 32, completely off the mounting portions, or partially on and partially off the mounting portions as shown in FIG. 6.

An adjacent electrical device 54 includes the same arrangement of alignment features as device 50. Thus, when the first and second electrical devices are mounted adjacent one another in an electrical box, the alignment features 46 on the first device 50, which are shown here as rectangular tabs, engage the alignment features 52 on the second electrical device, which are shown as rectangular notches. This arrangement of alignment features may provide improved vertical as well as horizontal and rotational alignment between the devices. Again, although shown as rectangular tabs and notches, the alignment features may be realized in other forms and different combinations of forms. Additionally, the top and bottom alignment features may be different from one another, e.g., the top alignment features may be rectangular and the bottom alignment features may be circular, etc.

Figure 7:
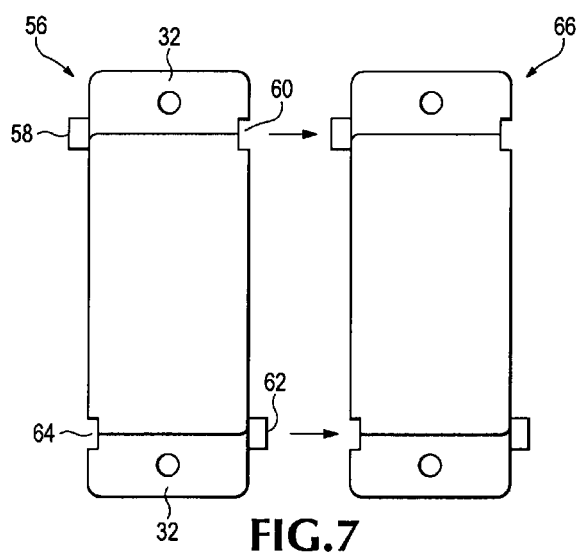
FIG. 7 illustrates a fifth embodiment of an electrical device according to some inventive principles of this patent disclosure.

FIG. 7 illustrates a fifth embodiment of an electrical device according to some inventive principles of this patent disclosure. The electrical device 56 of FIG. 7 is similar to the embodiment of FIG. 6, but the tab 58 and notch 60 that are located toward the top end of the device are moved to opposite sides of the device relative to the tab 62 and notch 64 located toward the bottom end of the device. This arrangement enables the device 56 to be rotated 180 degrees, i.e., mounted upside down, while still preserving the alignment functionality of the electrical device relative to a second electrical device 66 which has the same arrangement of alignment features.

The electrical devices of FIGS. 2-7 are illustrated with somewhat generic rectangular shapes, but the inventive principles may be applied to electrical devices of all shapes and sizes.

Figure 8:
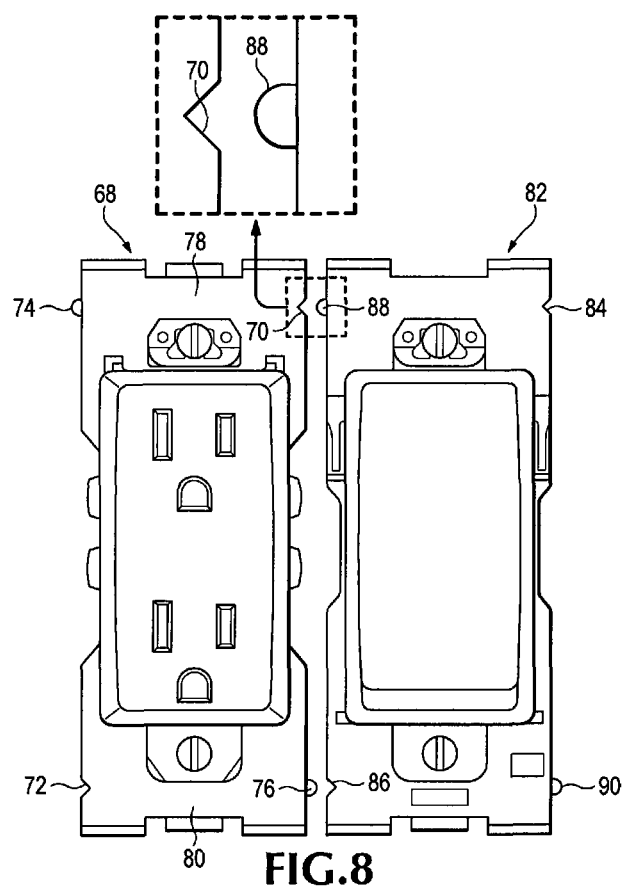
FIG. 8 illustrates example embodiments of electrical devices having alignment features according to some of the inventive principles of this patent disclosure.

FIG. 8 illustrates some more detailed example embodiments of electrical devices having alignment features according to some of the inventive principles of this patent disclosure. A first device 68, shown as a duplex receptacle wiring device, includes four alignment features including first and second recesses 70 and 72, and first and second protrusions 74 and 76. The alignment features are located near the ends of the mounting flanges 78 and 80 to provide wide spacing between the features at either end. A second device 82, shown as a rocker switch wiring device, includes similarly arranged alignment features 84, 86, 88 and 90.

In the embodiments of FIG. 8, the alignment features that are protrusions are formed as cylindrical or circular tabs, while the alignment features that are recesses are formed as V-shaped notches. These shapes are better visible in the enlarged inset of FIG. 8 which shows the example of notch 70 and tab 88.

Figure 9:
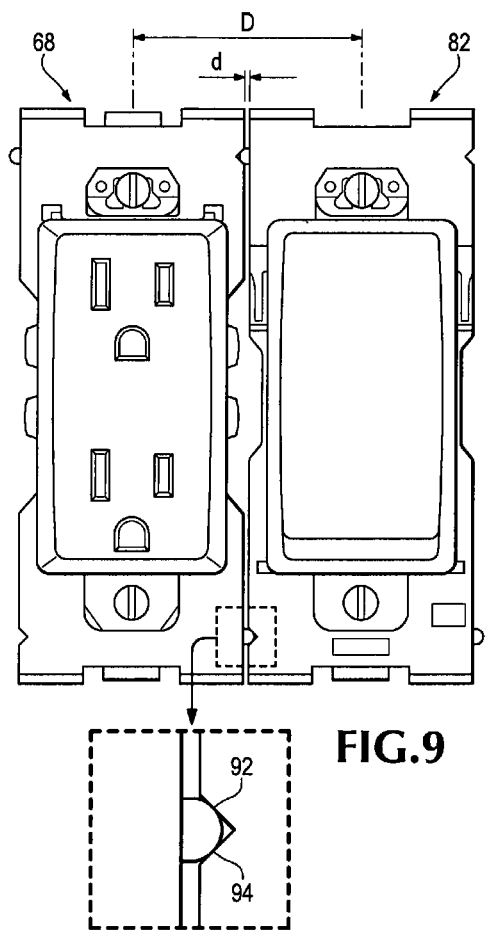
FIG. 9 illustrates examples of contact between alignment features shown in FIG. 8.

FIG. 9 illustrates how the alignment feature of the first device 68 contact the alignment features of the other device 82 when the two devices are mounted adjacent to each other and the alignment features on one device are engaged with the corresponding alignment features on the other device. The mounting flanges and alignment features are sized and shaped to maintain a distance "D" between the centerlines of the devices to enable the devices to align with suitable openings in a wall plate. This spacing may be, for example, the standard 1.821 inches for wall plates and electrical boxes specified by the National Electrical Manufacturers Association (NEMA), but other spacings may be used. The arrangement shown in FIG. 9 also leaves a space "d" between the devices to accommodate manufacturing tolerances, e.g., imperfections in the shapes of the sides of the devices, etc., as well as to accommodate variations during use, e.g., thermal expansion and contraction, etc.

As is apparent from FIGS. 8 and 9, either of the devices 68 or 82 may be rotated 180 degrees while still providing proper alignment.

There may be at least two advantages to the differing shapes of the alignment features shown in FIGS. 8 and 9. First, if there is any vertical misalignment as the features are brought into contact, the sides of the V-notch act as ramps to force the devices into the correct alignment as the tab is seated completely into the notch. Second, the cylindrical tab contacts the notch at two relatively small contact areas 92 and 94 as shown in the inset of FIG. 9. This may reduce or eliminate alignment problems caused by the presence of dust or debris on the parts.

Figure 10:
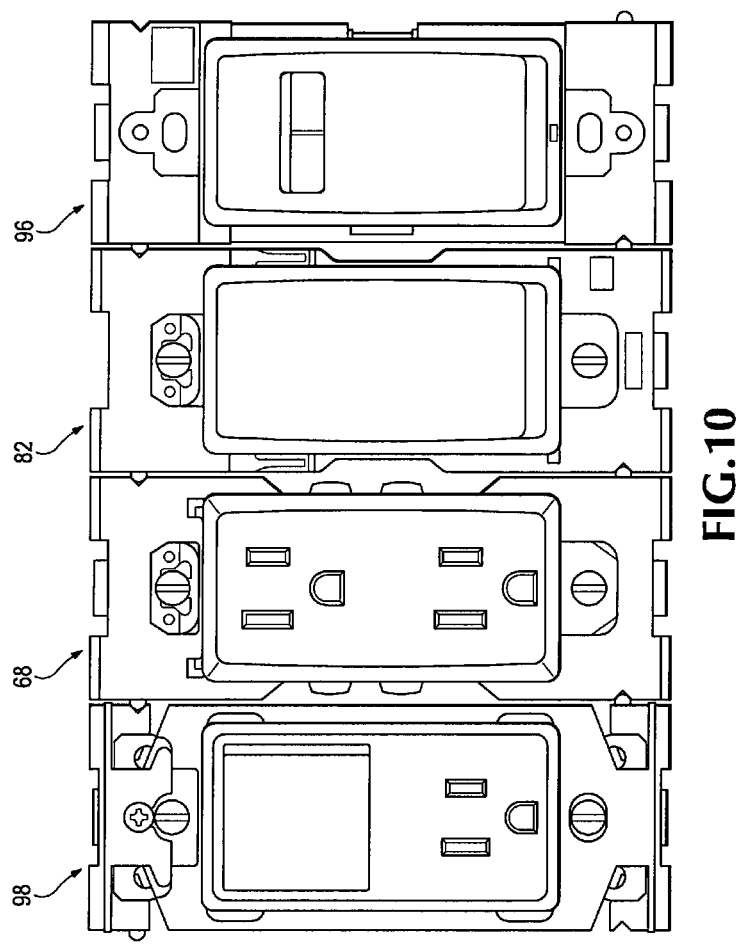
FIG. 10 illustrates a four-gang installation according to some of the inventive principles of this patent disclosure.

FIG. 10 illustrates a four-gang installation in which a variety of mix-and-match wiring devices having alignment features similar to those shown in FIGS. 8 and 9 and are installed adjacent to each other on a common electrical box. The installation shown in FIG. 10 includes a duplex receptacle 68, a rocker switch 82, a dimmer switch 96 and a combination rocker switch and single outlet device 98. On devices 68, 82 and 96, the alignment features are integral with the wiring devices, where as, on device 98, the alignment features are formed on an adapter ring for a standard wiring device as explained in more detail below.

An advantage of including alignment features that are integral with an electrical device is that it may provide a convenient technique for aligning devices without the need for tools or additional alignment parts. These features can typically be added to the device with little or no additional cost. Including the alignment features on an adapter, however, may also have its own advantages. For example, it may enable the inventive principles to be readily applied to the vast number and variety of existing electrical devices.

Although the inventive principles have been described in the context of alignment in a two-dimensional plane, the inventive principles may also provide alignment in the third dimension, e.g., to compensate for uneven wall surfaces.

Some additional inventive principles relate to adapters that may be used to provide spacing between an electrical device and a mounting surface.

FIG. 11 illustrates an embodiment of an adapter according to some of the inventive principles of this patent disclosure. FIG. 11 shows a standard wiring device 100 having mounting flanges 102 and 104 that are typically positioned against the face of building materials such as wall or ceiling cladding 106 when the wiring device is mounted to an electrical box 108. The face 110 of a standard wiring device typically projects a distance P1 which is about ¼ inch from the surface of the building materials, when the mounting flanges 102 and 104 are positioned against the surface of the building materials. Standard wall plates which may be used over the wiring device are designed to project the same distance from the wall surface to provide proper alignment with standard wiring devices.

For various aesthetic and/or functional reasons, it may be useful to design a wall plate that projects a greater distance P2 from the wall surface. In such cases, the wiring device 100 may be redesigned so the face 110 projects a greater distance from the mounting flanges 102 and 104 to align the face of the wiring device with the face of a wall plate projecting this greater distance P2. This may be an acceptable solution for newly designed wiring devices, but it fails to make use of the vast number and variety of existing electrical devices.

In one embodiment, the adapter shown in FIG. 11 includes a first spacer 112 arranged to space the first mounting flange 102 away from the building surface when the wiring device is mounted to an electrical box, and a second spacer 114 arranged to space the second mounting flange away from the building surface when the wiring device is mounted to the electrical box. In an alternative embodiment, an additional structure 116 may be included to connect the two spacers. The spacers may have a thickness that causes the face 110 of the wiring device to project at least a distance P2 from the wall surface to align with a wall plate that projects more than the standard distance, e.g., P2.

Figure 13:
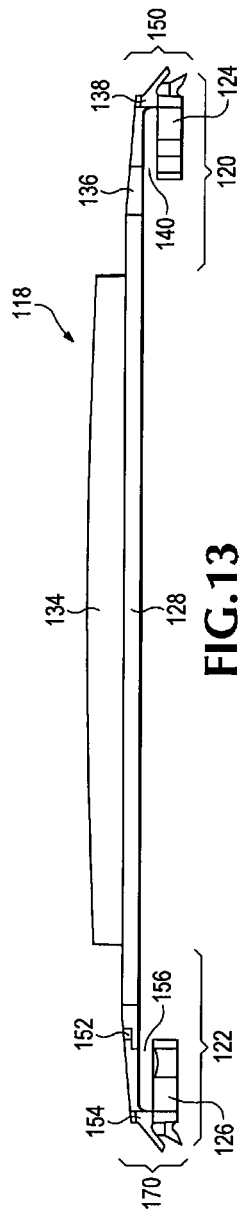

FIGS. 12 and 13 are perspective and side elevation views of another embodiment of an adapter according to some inventive principles of this patent disclosure. The adapter 118 of FIGS. 12 and 13 includes a first mounting portion 120 adapted to be attached to a first mounting portion of an electrical device at a first end of the electrical device, and a second mounting portion 122 adapted to be attached to a second mounting portion of the electrical device at a second end of the electrical device. The adapter also include first and second spacers 124 and 126 arranged to space the first and second mounting portion of the electrical device away from a building surface when the electrical device is mounted to an electrical box. In this embodiment, the spacers 124 and 126 each include two separate portions as shown in FIG. 12.

First and second side portions 128 and 130 connect the first and second mounting portions 120 and 122 of the adapter and are arranged to provide an opening 132 for access to the electrical device. The adapter may also include a rim 134 disposed about the opening to adapt the electrical device to a wall plate having an opening that is larger than a face of the electrical device.

The first mounting portion 120 of the adapter includes first top plate 136 and a first end cap 138. The first top plate, the first end cap and the first spacer 124 are arranged to form a first slot 140 to receive the first mounting portion of the electrical device as seen in FIG. 13. The first end cap may include an interface 150 for attaching a screw less wall plate.

Figure 14:
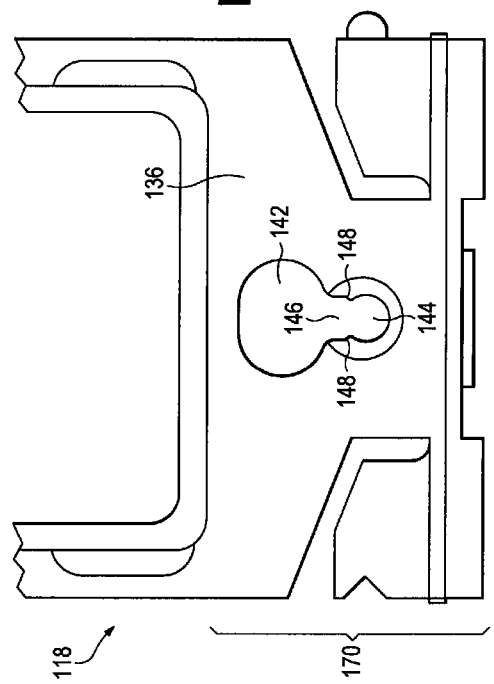
FIG. 14 is a close up view of a portion of the adapter illustrated in FIGS. 12 and 13.

Referring to FIG. 14, the first top plate 136 includes a first elongated hole 142 positioned to align with the elongated mounting hole on the first mounting portion of the electrical device. A second hole 144 is positioned to align with a wall plate mounting hole on the electrical device. The first and second holes are connected by a passage 146 that allows the shaft of a screw to pass between the holes. The first hole 142 is sized and shaped to allow the head of a screw that may be threaded into the wall plate mounting hole to pass through the first hole. The passage 146 is shaped so the shaft of the screw snaps into the second hole when the first mounting portion of the electrical device is inserted into the first slot as described in more detail below. In this embodiment, the snapping action is provided by protrusions 148.

Referring to FIGS. 12 and 13, the second mounting portion 122 of the adapter includes a second top plate 152 and a second end cap 154. The second top plate, the second end cap and the second spacer 126 are arranged to form a second slot 156 to receive the second mounting portion of the electrical device.

Figure 15:
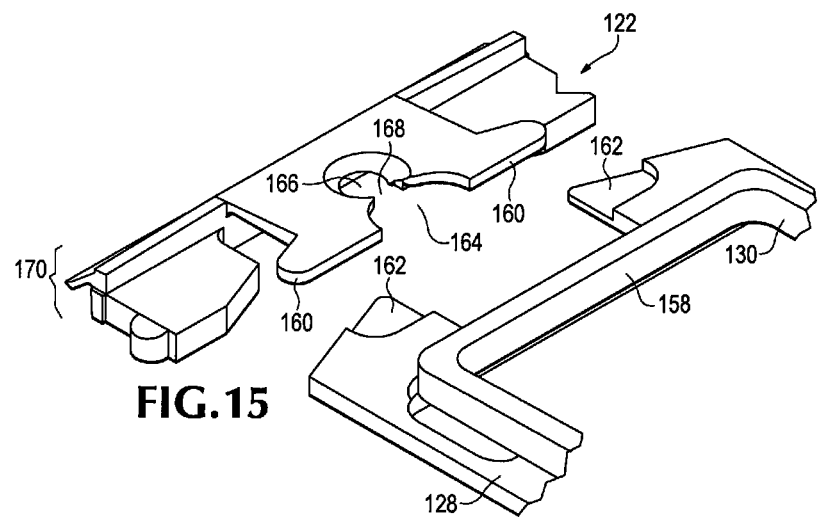
FIG. 15 is a close up view of another portion of the adapter illustrated in FIGS. 12 and 13.

Referring to FIG. 15, the second mounting portion 122 can be removed from the adapter. This leaves a connecting member 158 between the first and second side portions 128 and 130. The connecting member, the first and second side portions, and the first mounting portion 120 form a ring to surround the body of the electrical device. Making the second mounting portion 122 removable enables the ring to pivot around the body of the electrical device as the first mounting portion of the electrical device is inserted into the first slot as described below. The second mounting portion 122 can then be slid into position as the second mounting portion of the electrical device is inserted in to the second 156 slot while the ring is surrounding the body of the electrical device.

The second mounting portion 122 includes tabs 160 arranged to overlap tabs 162 on the remaining part of the adapter to secure the ring around the body of the electrical device after the second mounting portion is slid into position. The second end cap 154 also includes an interface 170 for attaching a screw less wall plate.

The second mounting portion 122 also includes a slot 168 having a first hole portion 164 positioned to align with the elongated mounting hole on the second mounting portion of the electrical device and a second hole portion 166 positioned to align with a wall plate mounting hole on the electrical device. When the second mounting portion 122 is slid into position on the rest of the adapter, the first hole portion 164 of the slot 168 forms a hole like that on the first mounting portion 120 shown in FIG. 14. The slot 168 is also sized and shaped so the shaft of a screw that may be threaded into the wall plate mounting hole snaps into the second hole portion 166 when the second mounting portion of the electrical device is inserted into the second slot.

FIGS. 16-21 illustrate one possible embodiment of a method for installing a wiring device using an adapter according to some inventive principles of this patent disclosure.

Figure 16:
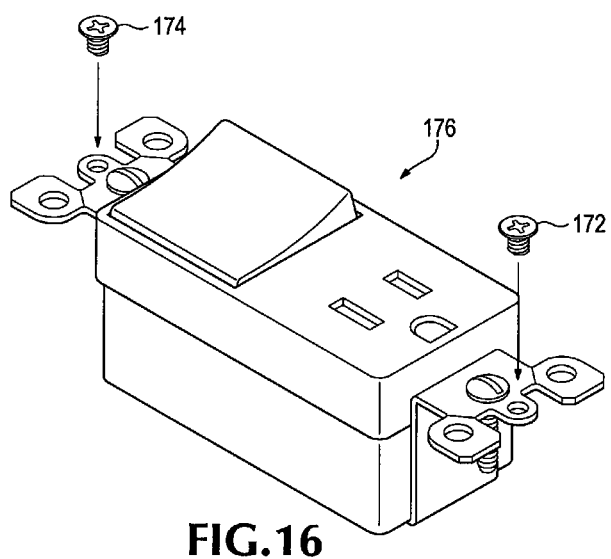
FIGS. 16-21 illustrate a method for installing a wiring device using an adapter according to some inventive principles of this patent disclosure.

Referring to FIG. 16, first and second screws 172 and 174 are partially threaded, e.g., with minimal thread engagement into the wall plate mounting holes of a standard wiring device 176. In this example, the device is shown with a face known as the designer type which is also sold under the brand name Decora® by Leviton Manufacturing Co., Inc., but the inventive principles may be applied to adapters for any other type of standard or non-standard electrical device.

Figure 17:
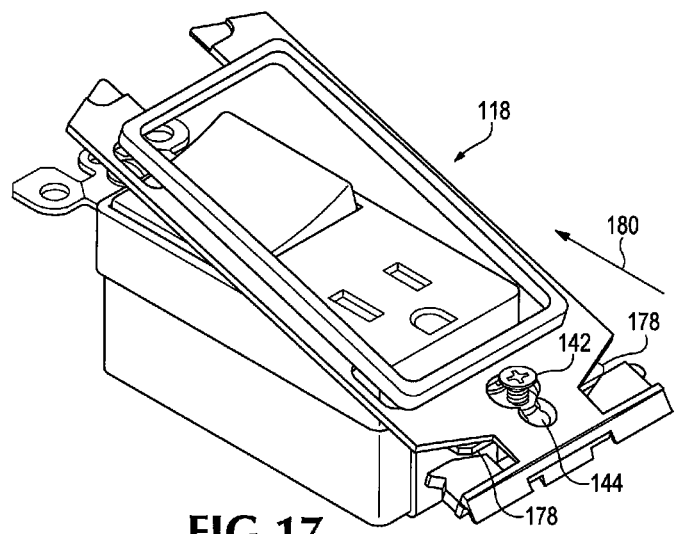
Figure 18:
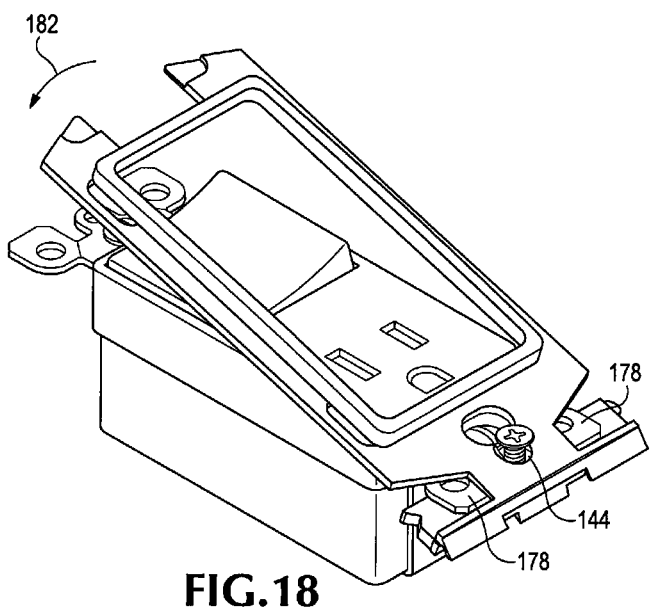

Referring to FIG. 17, the adapter 118 is positioned over the wiring device with the first screw passing through the first hole 142 on the first mounting portion of the adapter. The mounting ears 178 of the wiring device are aligned with the first slot on the adapter. The adapter is then slid in the direction of arrow 180 until the shaft of the first screw snaps into the second hole 144 and the mounting ears 178 are fully inserted into the slot as shown in FIG. 18. The first slot is arranged to enable the adapter ring to pivot down around the body of the electrical device as shown by arrow 182 after the first mounting portion of the electrical device has been inserted into the first slot.

Figure 19:
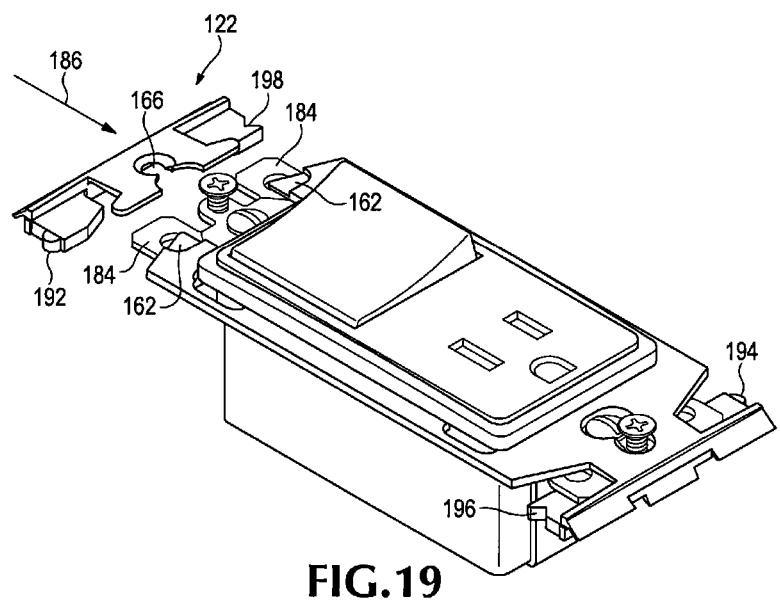
Figure 20:
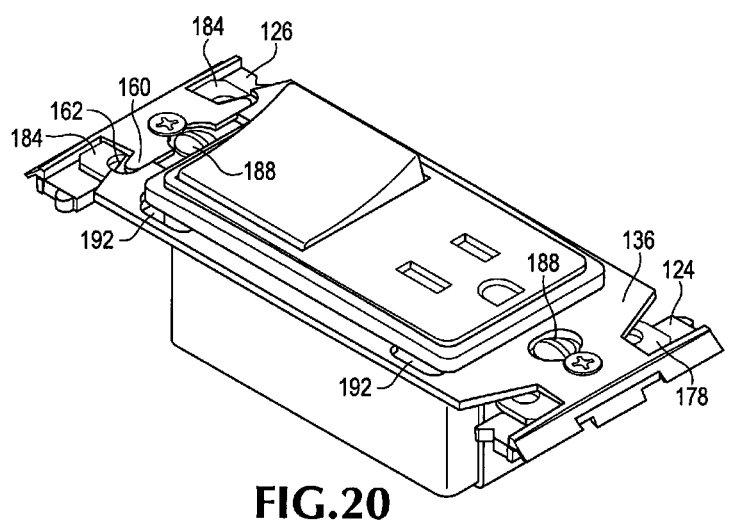

Referring to FIG. 19, the adapter ring stops pivoting when the tabs 162 on the adapter come to rest against the mounting ears 184 at the other end of the wiring device. The second mounting portion 122, which functions as an end piece for the adapter, is then slid into position in the direction of arrow 186 until the mounting ears 184 are fully inserted into the second slot and the shaft of the second screw snaps into the hole 166 as shown in FIG. 20. The screws are then tightened to secure the adapter to the wiring device. The mounting ears 178 at the first end of the wiring device are held securely between the first spacer 124 and first top plate 136, while the mounting ears 184 at the second end of the wiring device are held securely between the second spacer 126 and the second top plate 152. In turn, the tabs 162 on the adapter are held securely between the mounting ears 184 and the overlapping tabs 160 on the second mounting portion.

In an alternative embodiment of a method according to some inventive principles of this patent disclosure, the screws may be installed after the two pieces of the adapter are positioned on the wiring device. For example, the adapter 118 may be positioned over the wiring device so the mounting ears 178 of the wiring device are aligned with the first slot on the adapter. The adapter is then slid in the direction of arrow 180 until the mounting ears 178 are fully inserted into the slot as shown in FIG. 18, but without the screw 172 in place. The adapter ring is pivoted down around the body of the electrical device as shown by arrow 182, and the adapter ring stops pivoting when the tabs 162 on the adapter come to rest against the mounting ears 184 at the other end of the wiring device. The second mounting portion 122 is then slid into position in the direction of arrow 186 until the mounting ears 184 are fully inserted into the second slot, again without the screw 174 in place. The screws 172 and 174 are then installed and tightened to secure the adapter to the wiring device.

In yet another alternative embodiment, only one screw 172 may be partially threaded into the corresponding wall plate mounting hole before the two-piece adapter is installed on the wiring device. After the adapter is installed, the second screw 174 may be installed, and both screws 172 and 174 tightened.

Figure 21:
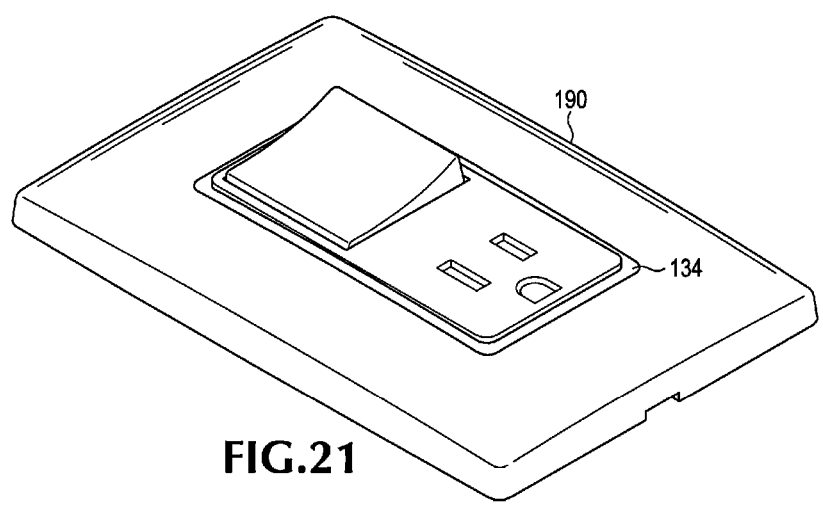

Thus, the adapter and wiring device may be securely attached in an interlocking assembly. The adapter and wiring device assembly may then be mounted to an electrical box using mounting screws 188. The spacers 124 and 126 position the mounting ears of the wiring device at the proper distance from the wall surface or other building materials so the face of the wiring device engages the face of wall plate 190 at the proper height as shown in FIG. 21. In this example, the opening in the wall plate is larger than the face of the standard wiring device, so the rim 134 takes up the space between the face of the wiring device and the opening of the wall plate.

Referring again to FIG. 20, the adapter may include slots 193 to accommodate various protrusions on different standard electrical devices.

The wall plate 190 shown in FIG. 21 is for a single gang installation. For multi-gang installations, the adapter may also include alignment features such as those described above with respect to FIGS. 2-10. For example, referring to FIG. 19, the adapter may include protrusions 192 and 194 and recesses 196 and 198 similar to those shown in FIGS. 8-10.

Thus, the inventive principles illustrated with respect to FIGS. 12-21 may enable the implementation of a complete and convenient system for utilizing existing electrical devices with new lines of electrical devices and face plates.

Although the embodiments of alignment features and adapters described above have been illustrated in some specific contexts, the inventive principles are not limited to these specific applications. For example, an adapter system may be implemented without spacers for the purpose of providing alignment features to existing electrical devices. In one such embodiment, an adapter may include first and second mounting portions 120 and 122 connected by side portions 128 and 130 similar to those shown in FIG. 13, but without the spacers 124 and 126. The alignment features may be moved to the top plates 136 and 152, which may be reconfigured accordingly. In another embodiment, the side portions 128 and 130 may be eliminated so the adapter only includes two separate mounting portions. These two parts may also include interfaces for screw less wall plates. Thus, an adapter kit may include two pieces that can be attached to either end of a standard wiring device to enable easy alignment of adjacent wiring devices and adapt the wiring devices for use with a screw less wall plate. In other embodiments, any combination of the alignment features, spacers, adapter rims, wall plate interfaces, etc. may be created according to the inventive principles of this patent disclosure.

The inventive principles of this patent disclosure have been described with reference to some specific example embodiments, but these embodiments can be modified in arrangement and detail without departing from the inventive concepts. Thus, any changes and modifications are considered to fall within the scope of the following claims.

The invention claimed is:

1. An adapter comprising:
   a first mounting portion adapted to be attached to a first mounting portion of an electrical device at a first end of the electrical device where the first mounting portion of the adapter comprises:
      a first top plate comprising a first hole positioned to align with a mounting hole on the first mounting portion of the electrical device and a second hole positioned to align with a wall plate mounting hole on the first mounting portion of the electrical device; and
      a first end cap;
      where the first top plate, the first end cap and a first spacer are arranged to form
   a first slot to receive the first mounting portion of the electrical device;
   a second mounting portion adapted to be attached to a second mounting portion of the electrical device at a second end of the electrical device;
   the first spacer coupled to the first mounting portion and arranged to space the first mounting portion of the electrical device away from a building surface when the electrical device is mounted to an electrical box; and
   a second spacer coupled to the second mounting portion and arranged to space the second mounting portion of the electrical device away from the building surface when the electrical device is mounted to the electrical box.

2. The adapter of claim 1 where the first and second mounting portions of the adapter are connected by a third portion of the adapter.

3. The adapter of claim 1 further comprising first and second side portions connected to the first mounting portion of the adapter.

4. The adapter of claim 3 further comprising a connecting member, where the connecting member, the first and second side portions, and the first mounting portion of the adapter are arranged to provide an opening for access to the electrical device.

5. The adapter of claim 4 further comprising a rim disposed about the opening to adapt the electrical device to a wall plate having an opening larger than a face of the electrical device.

6. The adapter of claim 1 where:
   the first and second holes are connected by a passage; and
   the first hole is sized and shaped allow the head of a screw threaded into the wall plate mounting hole to pass through the first hole.

7. The adapter of claim 6 where the passage is shaped so the shaft of the screw threaded into the wall plate mounting hole snaps into the second hole when the first mounting portion of the electrical device is inserted into the first slot.

8. The adapter of claim 1 where the first end cap includes an interface for attaching a screw less wall plate.

9. The adapter of claim 1 where the second mounting portion of the adapter comprises:
   a second top plate; and
   a second end cap;
   where the second top plate, the second end cap and the second spacer are arranged to form a second slot to receive the second mounting portion of the electrical device.

10. The adapter of claim 9:
    further comprising first and second side portions arranged to connect the first and second mounting portions of the adapter, and a connecting member;
    where the first and second side portions, the first mounting portion of the adapter, and the connecting member are arranged to form a ring to surround a body of the electrical device.

11. The adapter of claim 10 where the first slot is arranged to enable the ring to pivot around the body of the electrical device after the first mounting portion of the electrical device is inserted into the first slot.

12. The adapter of claim 10 where the second mounting portion of the adapter can be removed from the adapter to enable the second mounting portion of the electrical device to be inserted into the second slot while the ring is surrounding the body of the electrical device.

13. The adapter of claim 11 where the second mounting portion of the adapter includes a tab arranged to overlap a tab on the ring to secure the ring around the body of the electrical device.

14. The adapter of claim 11 where the second top plate comprises a slot positioned to align with a wall plate mounting hole on the second mounting portion of the electrical device.

15. The adapter of claim 14 where the slot is sized and shaped so the shaft of the screw threaded into the wall plate mounting hole snaps into the slot when the second mounting portion of the electrical device is inserted into the second slot.

16. The adapter of claim 14 where the second end cap includes an interface for attaching a screw less wall plate.

17. An adapter comprising:
    a first mounting portion adapted to be attached to a first mounting portion of an electrical device at a first end of the electrical device;
    a second mounting portion adapted to be attached to a second mounting portion of the electrical device at a second end of the electrical device;
    a first spacer coupled to the first mounting portion and arranged to space the first mounting portion of the electrical device away from a building surface when the electrical device is mounted to an electrical box;
    a second spacer coupled to the second mounting portion and arranged to space the second mounting portion of the electrical device away from the building surface when the electrical device is mounted to the electrical box; and
    an alignment feature adapted to align the electrical device with an adjacent electrical device by contacting the adjacent electrical device or an adapter for the adjacent electrical device.

18. The adapter of claim 17 where the alignment feature is configured to enable the electrical device to be aligned with the adjacent electrical device by sliding the electrical device toward the adjacent electrical device or an adapter for the adjacent electrical device.

19. The adapter of claim 18 where the alignment feature comprises a protrusion.

20. The adapter of claim 17 where the first and second mounting portions of the adapter are connected by a third portion of the adapter.

21. The adapter of claim 17 where:
the alignment feature is a first alignment feature located on the first mounting portion of the adapter; and
the adapter further comprises a second alignment feature located on the second mounting portion of the adapter, and adapted to align the electrical device with the adjacent electrical device by contacting another alignment feature attached to the adjacent electrical device.

22. The adapter of claim 21 further comprising:
a third alignment feature located opposite the first alignment feature on the first mounting portion of the adapter; and
a fourth alignment feature located opposite the second alignment feature on the second mounting portion of the adapter.

23. The adapter of claim 22 where:
the first and fourth alignment features comprise protrusions; and
the second and third alignment features comprise recesses.

24. The adapter of claim 22 where the protrusions and recesses are arranged so the alignment functionality of the adapter is preserved when the electrical device is rotated 180 degrees and the first and second mounting portions of the adapter are attached to the first and second mounting portions of the electrical device, respectively.

25. The adapter of claim 17 further comprising first and second side portions arranged to connect the first and second mounting portions of the adapter.

26. The adapter of claim 25 where the first and second side portions and first and second mounting portions of the adapter are arranged to provide an opening for access to the electrical device.

27. The adapter of claim 17 where:
the first mounting portion of the adapter is adapted to be attached to the electrical device with a screw threaded into a wall plate mounting hole on the first mounting portion of the electrical device; and
the first mounting portion of the adapter includes an interface for attaching a screw less wall plate.

28. A method comprising:
attaching an adapter to an electrical device, where the adapter includes first and second mounting portions to engage first and second mounting portions of the electrical device; and
attaching the adapter and electrical device to an electrical box mounted in a building surface:
where the adapter includes first and second spacers arranged to space the electrical device away from the building surface;
the second mounting portion of the adapter is removable from the adapter; and
attaching the adapter to the electrical device comprises inserting the first mounting portion of the electrical device into a first slot in the first mounting portion of the adapter and sliding the second mounting portion toward the remainder of the adapter to insert the second mounting portion of the electrical device into a second slot in the second mounting portion of the adapter.

29. The method of claim 28 further comprising pivoting a ring portion of the adapter around the electrical device prior to sliding the second mounting portion toward the remainder of adapter.

30. The method of claim 28 further comprising locking the remainder of adapter to the electrical device with the second mounting portion of the adapter.

31. The method of claim 28 further comprising engaging an alignment feature on the adapter with a second electrical device or an adapter for the second electrical device.

32. The method of claim 31 where engaging the alignment feature comprises sliding the electrical device toward the adjacent electrical device or an adapter for the adjacent electrical device.

33. An adapter comprising:
a ring to surround a body of a standard electrical device;
a first slot included in a first end piece to receive a first mounting portion of the standard electrical device, the first end piece arranged to enable the ring to pivot into position around the body of the standard electrical device as the first mounting portion is inserted into the first slot; and
a second slot included in a second end piece to receive a second mounting portion of the standard electrical device,
where the second end piece is removable to enable the second mounting portion of the standard electrical device to be inserted in to the second slot while the ring is in position around the body of the standard electrical device.

34. The adapter of claim 33 further comprising a rim disposed about the ring to adapt the standard electrical device to a wall plate having an opening larger than a face of the standard electrical device.

35. The adapter of claim 34 further comprising an interface for a screw less wall plate.

36. The adapter of claim 35 further comprising an alignment feature adapted to align the standard electrical device with an adjacent electrical device by contacting the adjacent electrical device.

37. A system comprising:
an adapter according to claim 33; and
a wall plate having a rim to rest against the building surface and an opening arranged to receive a face of the standard electrical device when the mounting portion of the standard electrical device is spaced a substantial distance away from the building surface.

38. The system of claim 37 where:
the opening of the wall plate is substantially larger than the face of the standard electrical device; and
the adapter includes a rim to adapt the face of the standard electrical device to the opening of the wall plate.

39. The system of claim 38 where:
the adapter includes an interface for a screw less wall plate; and
the wall plate is adapted to mount to the interface.

* * * * *